(12) United States Patent
Antony Prince (10) Patent No.: US 11,235,284 B2
(45) Date of Patent: Feb. 1, 2022

(54) MEMBRANE WATER TREATMENT SYSTEM AND METHOD THEREOF

(71) Applicant: MEMSIFT INNOVATIONS PTE. LTD., Singapore (SG)

(72) Inventor: James Selvaraj Antony Prince, Singapore (SG)

(73) Assignee: MEMSIFT INNOVATIONS PTE. LTD., Pantech Business Hub (SG)

( * ) Notice: Subject to any disclaimer, the term of this patent is extended or adjusted under 35 U.S.C. 154(b) by 104 days.

(21) Appl. No.: 16/758,336

(22) PCT Filed: Oct. 25, 2018

(86) PCT No.: PCT/SG2018/050539
§ 371 (c)(1),
(2) Date: Apr. 22, 2020

(87) PCT Pub. No.: WO2019/083459
PCT Pub. Date: May 2, 2019

(65) Prior Publication Data
US 2020/0338501 A1    Oct. 29, 2020

(30) Foreign Application Priority Data
Oct. 25, 2017    (IN) .............................. 201741037712

(51) Int. Cl.
*B01D 61/36* (2006.01)
*B01D 63/02* (2006.01)
(Continued)

(52) U.S. Cl.
CPC ......... *B01D 61/364* (2013.01); *B01D 61/362* (2013.01); *B01D 61/368* (2013.01);
(Continued)

(58) Field of Classification Search
CPC ............ B01D 63/02; B01D 2311/2673; B01D 61/364; B01D 61/362; B01D 61/368; B01D 2311/04; B01D 2311/06; B01D 2311/103; B01D 2311/14; B01D 2313/24; B01D 2313/28; B01D 2325/02; B01D 53/268; B01D 53/265; C02F 1/442; C02F 1/444; C02F 1/447; C02F 2103/08
See application file for complete search history.

(56) References Cited

U.S. PATENT DOCUMENTS

| | | | |
|---|---|---|---|
| 6,656,361 B1 | 12/2003 | Herron et al. | |
| 2004/0211725 A1* | 10/2004 | Jansen | B01D 61/364 210/640 |

(Continued)

OTHER PUBLICATIONS

International Search Report for International Application No. PCT/SG2018/050539 dated May 2, 2019.

(Continued)

*Primary Examiner* — Krishnan S Menon
(74) *Attorney, Agent, or Firm* — Burns & Levinson LLP; Steven M. Mills (57) ABSTRACT

This document describes systems and methods for treating and recovering water from feed solutions using a membrane module that has a plurality of hollow fiber membranes encapsulated in a collection chamber and an expansion chamber that is connected to the outlet of the membrane module.

21 Claims, 8 Drawing Sheets

(51) Int. Cl.
*C02F 1/44* (2006.01)
*C02F 103/08* (2006.01)

(52) U.S. Cl.
CPC .............. *B01D 63/02* (2013.01); *C02F 1/447* (2013.01); *B01D 2311/04* (2013.01); *B01D 2311/06* (2013.01); *B01D 2311/103* (2013.01); *B01D 2311/14* (2013.01); *B01D 2313/24* (2013.01); *B01D 2313/28* (2013.01); *B01D 2325/02* (2013.01); *C02F 2103/08* (2013.01)

(56) References Cited

U.S. PATENT DOCUMENTS

| | | | |
|---|---|---|---|
| 2004/0211726 A1 | 10/2004 | Baig et al. | |
| 2006/0144788 A1 | 7/2006 | Cath et al. | |
| 2006/0213757 A1* | 9/2006 | Yang | B01D 3/14 |
| | | | 203/1 |
| 2012/0267306 A1* | 10/2012 | McGinnis | C02F 1/04 |
| | | | 210/637 |
| 2014/0318945 A1* | 10/2014 | Heinzl | B01D 61/364 |
| | | | 202/154 |
| 2017/0320733 A1* | 11/2017 | Kriegel | C01B 13/0251 |
| 2018/0118585 A1* | 5/2018 | Chidambaran | B01D 61/366 |

OTHER PUBLICATIONS

Written Opinion for International Application No. PCT/SG2018/050539 dated May 2, 2019.

\* cited by examiner

MEMBRANE WATER TREATMENT SYSTEM AND METHOD THEREOF

CROSS REFERENCE TO RELATED APPLICATIONS

This application is a national stage application, filed under 35 U.S.C. § 371, of International Application No. PCT/SG2018/050539, filed Oct. 25, 2018, which claims priority to IN 201741037712, filed Oct. 25, 2017, each of which is incorporated herein by reference in its entirety.

FIELD OF THE INVENTION

The present invention generally concerns systems and methods for treating a feed solution. More specifically, the invention discloses membrane based distillation systems and methods for recovering water and resources from a feed solution with enhanced efficiency and zero liquid discharge.

BACKGROUND OF THE INVENTION

In many countries, the discharge of industrial wastewater (e.g. from mining, oil and gas, semiconductor fabrication, electroplating, pharmaceutical, dye/textile and nuclear power production etc.) with high Total Dissolved Solids (TDS) or/Chemical Oxygen Demand (COD) into the sewer or natural water bodies is prohibited to prevent overloading of the water treatment plant or destruction to marine lives.

Reverse osmosis (RO) is one of the major technologies that have been used to treat low strength industrial wastewater, seawater, surface wastewater for reuse or drinking. However, a drawback of RO, for instance in seawater desalination, is its low recovery of water (approximately 45%) from seawater due to limitations in highly pressurized systems that are required for recovering water from solutions having high osmotic strengths. Furthermore, RO poses a challenge in the disposal of the brine or high strength industrial wastewater that remains after water has been recovered.

Therefore, brine/high strength industrial wastewater treatment systems with zero liquid discharge (ZLD) are potentially advantageous. Currently, conventional thermal separation processes such as, multi-stage evaporator and crystallizer technology have been used as a post RO process to recover more water and to separate other contaminants/salts from the wastewater. However, these thermal separation processes are highly energy demanding.

More recently, membrane distillation has been considered as a low cost, energy-saving alternative to the above thermal separation processes. In a membrane distillation system, a membrane that is permeable to vapour but impermeable to liquid water separates a heated feed water stream from a cooler product water stream. Water vapour that is evaporated from the heated feed stream passes through the membrane due to a gradient in vapour pressure and condenses in the product water stream. The advantages of the membrane distillation system are relatively low operating pressures and temperatures as compared with conventional thermal based separation process, hence decreasing energy demands.

Hence, membrane distillation is a good alternative for treating wastewater. However, the distillation membranes that are used are very sensitive to acid and organic solvents that alter the wettability of the membranes. If the membrane is wetted, the wetted membrane as used in conventional membrane distillation process will allow contaminants to pass through the membrane and contaminates the product water.

It is an objective of this invention to provide membrane based systems and methods thereof for treating water with enhanced energy efficiencies over the current thermal separation and water distillation processes. The present invention also ideally provides zero liquid discharge and could complement other water processes such as but not limited to RO to improve water recovery. The present invention is also able to separate liquids with different boiling points (e.g; alcohol:water/acetone:water/oil:water/glycol:water/etc.).

SUMMARY OF THE INVENTION

The above and other problems in the art are solved and an advance in the art is made in accordance with this invention.

A first advantage of a membrane water treatment system in accordance with this invention is that up to 100% of water may be recovered from wastewater or contaminated feed solutions.

A second advantage of a membrane water treatment system in accordance with this invention is that this system is more energy efficient than existing membrane distillation systems.

A third advantage of a membrane water treatment system in accordance with this invention is that this system is able to recover water at a faster rate while consuming less energy as compared to existing membrane distillation systems.

A fourth advantage of a membrane water treatment system in accordance with this invention is that this system is scalable.

A fifth advantage of a membrane water treatment system in accordance with this invention is that this system is able to separate liquids with different boiling points.

In accordance with a first aspect of the invention, the invention comprises a system for treating a feed solution, the system comprising: a membrane module comprising: at least one hollow fiber membrane extending between an inlet and an outlet of the membrane module, the hollow fiber membrane having an inner bore for receiving and passing through a pressurized and heated feed solution, and a collection chamber having a partial vacuum, the collection chamber configured to collect water vapour from the bore of the hollow fiber membrane; an expansion chamber, having another partial vacuum, being provided at the outlet of the membrane module for causing the feed solution from the outlet of the membrane module to expand as the feed solution exits the outlet of the membrane module; and a condenser configured to receive and condense water vapour from the collection chamber and the expansion chamber.

In accordance with embodiments of the first aspect of the invention, the collection chamber and the expansion chamber are connected to a vacuum generator, whereby the vacuum generator supplies a negative pressure to the collection chamber and the expansion chamber.

In accordance with embodiments of the first aspect of the invention, the membrane module further comprises a pressurization chamber provided adjacent the inlet of the membrane module for pressurizing the feed solution before the pressurized feed solution is directed to the inlet of the membrane module.

In accordance with embodiments of the first aspect of the invention, the system further comprises an air bubble generator provided adjacent the inlet of the membrane module for bubbling the feed solution before the bubbled feed solution is directed to the inlet of the membrane module.

In accordance with embodiments of the first aspect of the invention, the system further comprises a heater provided adjacent the inlet of the membrane module for heating the feed solution before the heated feed solution is directed to the inlet of the membrane module.

In accordance with embodiments of the first aspect of the invention, the system further comprises the condenser being configured to utilize heat absorbed from the water vapour to heat the feed solution before the heated feed solution is directed to the inlet of the membrane module.

In accordance with embodiments of the first aspect of the invention, the system further comprises a non-return valve provided at the inlet of the membrane module for ensuring unidirectional flow of the feed solution to the inner bore of the hollow fiber membrane.

In accordance with embodiments of the first aspect of the invention, the hollow fiber membrane comprises a microporous structure, having an average pore size between 1 nanometre and 100,000 nanometres whereby the preferred pore size is between 50 nanometres to 500 nanometres.

In accordance with embodiments of the first aspect of the invention, the system further comprises: a feed tank connected to the expansion chamber, the feed tank configured to collect the feed solution from the expansion chamber; a tube having a first end connected to the feed tank and a second end connected to the inlet of the membrane module, the tube configured to direct the feed solution from the feed tank to the inlet of the membrane module, whereby a part of the tube is in contact with a heat exchanger such that heat from the heat exchanger is absorbed by the part of the tube.

In accordance with a second aspect of the invention, a method for treating a feed solution using a membrane module having at least one hollow fiber membrane extending between an inlet and an outlet of the membrane module and having a collection chamber with a partial vacuum is disclosed, the method comprising: receiving, at the inlet of the membrane module, a pressurized and heated feed solution; passing the pressurized and heated feed solution through an inner bore of the at least one hollow fiber membrane; collecting at the collection chamber, water vapour from the inner bore of the at least one hollow fiber membrane; expanding, at an expansion chamber provided at the outlet of the membrane module, feed solution from the outlet of the membrane module as the feed solution exits the outlet of the membrane module, whereby the expansion chamber has another partial vacuum; and receiving and condensing water vapour from the collection chamber and expansion chamber using a condenser.

In accordance with embodiments of the second aspect of the invention, the collection chamber and the expansion chamber are connected to a vacuum generator, whereby the vacuum generator supplies a negative pressure to the collection chamber and the expansion chamber.

In accordance with embodiments of the second aspect of the invention, wherein before the step of receiving, at the inlet of the membrane module, the pressurized and heated feed solution, the method comprising the step of: pressurizing the feed solution, using a pressurization chamber provided adjacent the inlet of the membrane module, before the pressurized feed solution is directed to the inlet of the membrane module.

In accordance with embodiments of the second aspect of the invention, wherein before the step of receiving, at the inlet of the membrane module, the pressurized and heated feed solution, the method comprising the step of: bubbling the feed solution, using an air bubble generator provided adjacent the inlet of the membrane module, before the bubbled feed solution is directed to the inlet of the membrane module.

In accordance with embodiments of the second aspect of the invention, wherein before the step of receiving, at the inlet of the membrane module, the pressurized and heated feed solution, the method comprising the step of: heating the feed solution, using a heater provided adjacent the inlet of the membrane module, before the heated feed solution is directed to the inlet of the membrane module.

In accordance with embodiments of the second aspect of the invention, wherein the hollow fiber membrane comprises a microporous structure, having an average pore size between 1 nanometre and 100,000 nanometres and whereby the preferred pore size is between 50 nanometres to 500 nanometres.

In accordance with embodiments of the second aspect of the invention, the method further comprises collecting the feed solution from the expansion tank using a feed tank connected to the expansion chamber; directing the feed solution from the feed tank to the inlet of the membrane module using a tube having a first end connected to the feed tank and a second end connected to the inlet of the membrane module, whereby a part of the tube is in contact with the heat exchanger; and heating the feed solution in the tube as the feed solution passes the part of the tube that is in contact with the heat exchanger.

BRIEF DESCRIPTION OF THE DRAWINGS

The drawings illustrate, by way of example, exemplary embodiments of the present invention and should not be taken to be limiting the scope of the present invention.

DETAILED DESCRIPTION

Embodiments of the present invention are described herein. The person of ordinary skill in the art will realise that the following description of the present invention is for illustrative purposes only and should not be seen in any way as limiting the scope of the invention. Other embodiments of the invention may be devised by such skilled persons without deviating from the present invention.

The present invention provides systems and methods for treating water, in particular, for recovery of water from sources including but not limited to industrial wastewater, seawater, or wastewater from an upstream water treatment process such as reverse osmosis or the like. It may also be used to separate liquids with different boiling points (e.g.; alcohol: water/acetone: water/oil: water/glycol: water/etc.). In another embodiment of the invention, the present invention may also be used as part of a cooler as it removes heat from a liquid medium by enhancing evaporation of the liquid.

Figure 1:
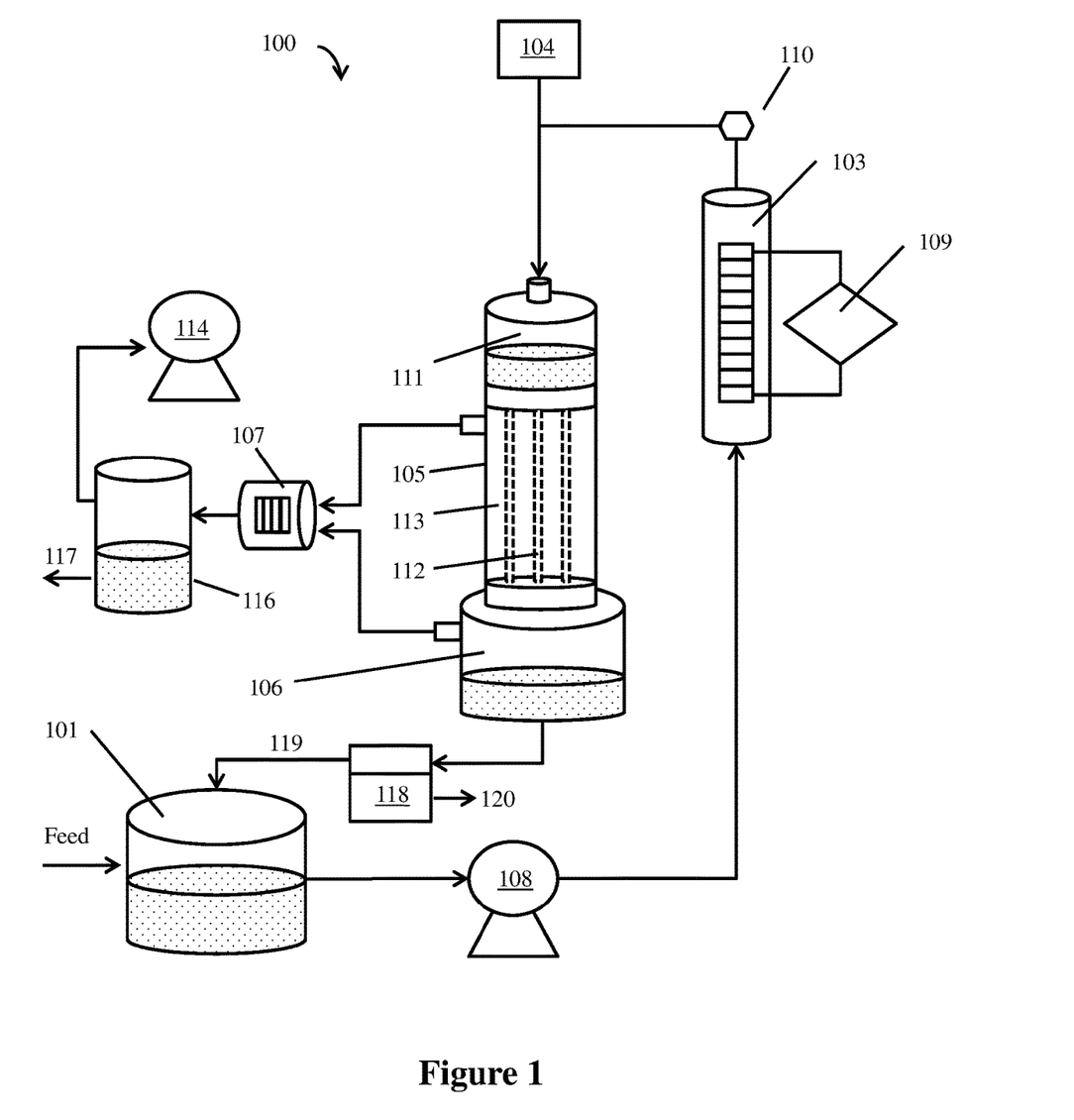
FIG. 1 is a schematic drawing of an embodiment of a water treatment system in accordance with embodiments of the invention.

In an aspect of the invention, a water treatment system for treating wastewater is provided. FIG. 1 shows an exemplary embodiment of a water treatment system (100) in accordance with the present invention. The water treatment system (100) comprises a feed tank (101); one or more heating elements (103); a pressurizing unit (104); a membrane module (105); an expansion chamber (106) and a condenser (107).

The feed tank (100) is configured to receive and store liquids that are to be treated by the water treatment system (100). As mentioned earlier, the liquid that is to be treated may be industrial wastewater, seawater or wastewater from an upstream water treatment process and is collectively termed either as feed solution or wastewater from here onwards and one skilled in the art will recognize that most types of liquids may be used as the feed solution or wastewater without departing from this invention. The wastewater is heated by passing the wastewater through one or more heating elements (103). This may be carried out by way of a centrifugal or magnetic pump (108). The one or more heating elements (103) may be a heater (103) that generates heat from a power source (109) or a heat exchanger that has been configured to transfer heat to the wastewater from external steam or hot water.

The pressurizing unit (104) is configured to pressurize the wastewater prior to feeding the wastewater to the membrane module (105). The person skilled in the art would realise that the sequence of heating and pressurizing may be interchangeable or may occur simultaneously and the pressurization of liquid leads to a corresponding increase in temperature, hence less energy may be expended in heating the wastewater.

In some embodiments, the pressurizing unit (104) may be a compressed gas supply that delivers compressed gas to the wastewater. Besides serving to pressurize the wastewater, the compressed gas serves as an air bubble generator that enhances evaporation of the wastewater in later stages of the water treatment system (100).

In some embodiments, the water treatment system (100) may further comprise a non-return valve (110) prior to the pressurizing unit (104) to ensure unidirectional flow of the wastewater into the membrane module (105).

In some embodiments, the water treatment system (100) may further comprise a pressurization chamber (111) configured to receive heated waste water from the heating elements (103). The pressurization chamber (111) may be a part of the membrane module (105) or a separate unit positioned adjacent to the membrane module (105). The pressurization chamber (111) is in fluid communication with the pressurizing unit (104) to compress the heated wastewater within the pressurization chamber (111) and feed the heated, pressurized wastewater into the membrane module (105). In some embodiments, the pressurization chamber (111) may further be in fluid communication with the heating elements (103) so that any water vapour within the pressurization chamber may be channelled to the heating elements (103) for heating the wastewater.

The membrane module (105) comprises a first end or an inlet for receiving heated, pressurized wastewater and a second end or an outlet that is in fluid connection to the expansion chamber (106). The membrane module (105) further comprises a plurality of hollow fiber membrane (112) and a collection chamber (113). In embodiments of the invention, the hollow fiber membrane (112) may be made of a porous membrane permeable to water vapour but impermeable to liquid that surrounds an inner hollow bore. The collection chamber (113) is formed within a cavity of the membrane module (105) and as illustrated in FIG. 1, collection chamber (113) envelops the plurality of hollow fiber membranes (112) within the membrane module (105). The collection chamber (113) is maintained at a partial vacuum to ensure that a pressure difference exists between the inner hollow bore of the hollow fiber membrane (112) and the collection chamber (113). The partial vacuum in collection chamber (113) may be maintained through the use of vacuum generator (114) however, one skilled in the art will recognize that other means may be used to maintain a partial vacuum within collection chamber (113) without departing from this invention.

The membrane module (105) is configured such that in operation, heated, pressurized wastewater is directed into an inlet of the membrane module (105) which in turn causes the heated, pressurized wastewater to flow into the hollow bore of the hollow fiber membrane (112) through a first end of the hollow fiber membrane (112). As the heated, pressurized wastewater flows along the hollow fiber membrane (112), part of the wastewater evaporates and the water vapour is transmitted across the hollow fiber membrane (112) from a bore side to a shell side of the hollow fiber membrane (112) into the surrounding collection chamber (113). The pressure difference between the heated, pressurized wastewater in the bore of the hollow fiber membrane (112) and the collection chamber (113) further encourages the transfer of water vapour into the collection chamber (113). The remaining wastewater then exits a second end of the hollow fiber membrane (112).

In a preferred embodiment, the plurality of hollow fiber membranes (112) are arranged to extend along a length of the membrane module (105), the first and second end of the hollow fiber membrane (112) corresponding to the first end or inlet and second end or outlet of the membrane module (105) respectively. Each of the hollow fiber membranes (112) is made up of a microporous structure whereby this structure has an average pore size between 1 nanometre and 100,000 nanometres. In embodiments of the invention, the average pore size is preferably between 50 nanometres to 500 nanometres.

In some embodiments, the multiplicity of hollow fiber membrane (112) are bundled and held together by adhesive blocks at the first and second ends of the hollow fiber membrane (112). The adhesive blocks serving to also define part of the collection chamber (113) and isolate the collection chamber (113) from an exterior surrounding of the membrane module (105).

The expansion chamber (106) is in fluid connection with the second end or outlet of the membrane module (105) and is also maintained at a partial vacuum to ensure that a pressure difference exists between the inner hollow bore of the hollow fiber membrane (112) and the expansion chamber (106). The partial vacuum in expansion chamber (106) may be maintained through the use of vacuum generator (114) however, one skilled in the art will recognize that other means may be used to maintain a partial vacuum within expansion chamber (106) without departing from this invention. The partial vacuum in the expansion chamber (106) may be the same as the partial vacuum in the collection chamber (113) or may be different and this is left as a design choice to a person skilled in the art. After the heated, pressurized wastewater leaves the second end of the hollow fiber membrane (112) via the outlet of the membrane module (105), the expansion chamber (106) then receives the heated, pressurized wastewater. As the heated, pressurized wastewater experiences a sudden drop in pressure as the heated, pressurized wastewater enters the expansion chamber (106), the heated, pressurized wastewater expands abruptly in the expansion chamber (106). The sudden expansion of the heated, pressurized wastewater drives further evaporation of the heated, pressurized wastewater, partly due to the Joule-Thomson effect.

In a preferred embodiment, a vacuum pump (114) may be in fluid connection with the expansion chamber (106) and collection chamber (113) and this vacuum pump (114) is used for maintaining a pressure difference across the hollow bore of the hollow fiber membrane (112) and the collection chamber (113) and for maintaining a pressure difference across the bore of the hollow fiber membrane (112) and the expansion chamber (106). In some embodiments, the pressure within the expansion chamber (106) is maintained at a negative pressure of around −0.5 bar and one skilled in the art will recognize that other values of negative pressure may be applied without departing from this invention as long as there exists a higher pressure within the hollow bore of the hollow fiber membrane (112) as compared to the expansion chamber (106) and collection chamber (113).

Water vapour collected in the collection chamber (113) and expansion chamber (106) may then be channelled to the condenser (107) for condensing. The resulting water that is free from contaminants may be stored in the condenser (107) or channelled away for use or storage in a separate container such as container (116). When the water is to be utilized, it may then be obtained from outlet (117) as required.

In some embodiments, the collection chamber (113) and expansion chamber (106) may be in fluid communication to facilitate the movement of water vapour across the hollow fiber membrane (112) from the bore side to the shell side of the hollow fiber membrane (112).

In a preferred embodiment, the wastewater that has not been evaporated collects at the bottom of the expansion chamber (106) and is directed to a solid separator device (118). Solid separator device (118) removes or filters out any solids that may have formed in the remnant wastewater and these removed solids are then extracted out through outlet (120). The filtered remnant wastewater is then directed along path (119) back into feed tank (101) for running through water treatment system (100) again to increase the water recovery rate. Hence, as no liquids are prematurely discharged, the water treatment system (100) may be considered as a zero liquid discharge system. It is useful to note that the wastewater at the bottom of the expansion chamber (106) is much cooler as compared to the wastewater that entered the inlet of membrane module (105). This is because most of the heat has been removed from the wastewater via evaporation as the wastewater passed through the membrane module (105) and into the expansion chamber (106).

It is useful to note at this stage that the water treatment system (100) of the present invention offers several advantages over the conventional water treatment systems such as a lower operating temperature due to application of partial pressure and moderate operating pressure, enhanced mass transfer from liquid to gaseous state, leading to higher recovery, higher gain output ratio and hence improved energy efficiency.

Figure 2:
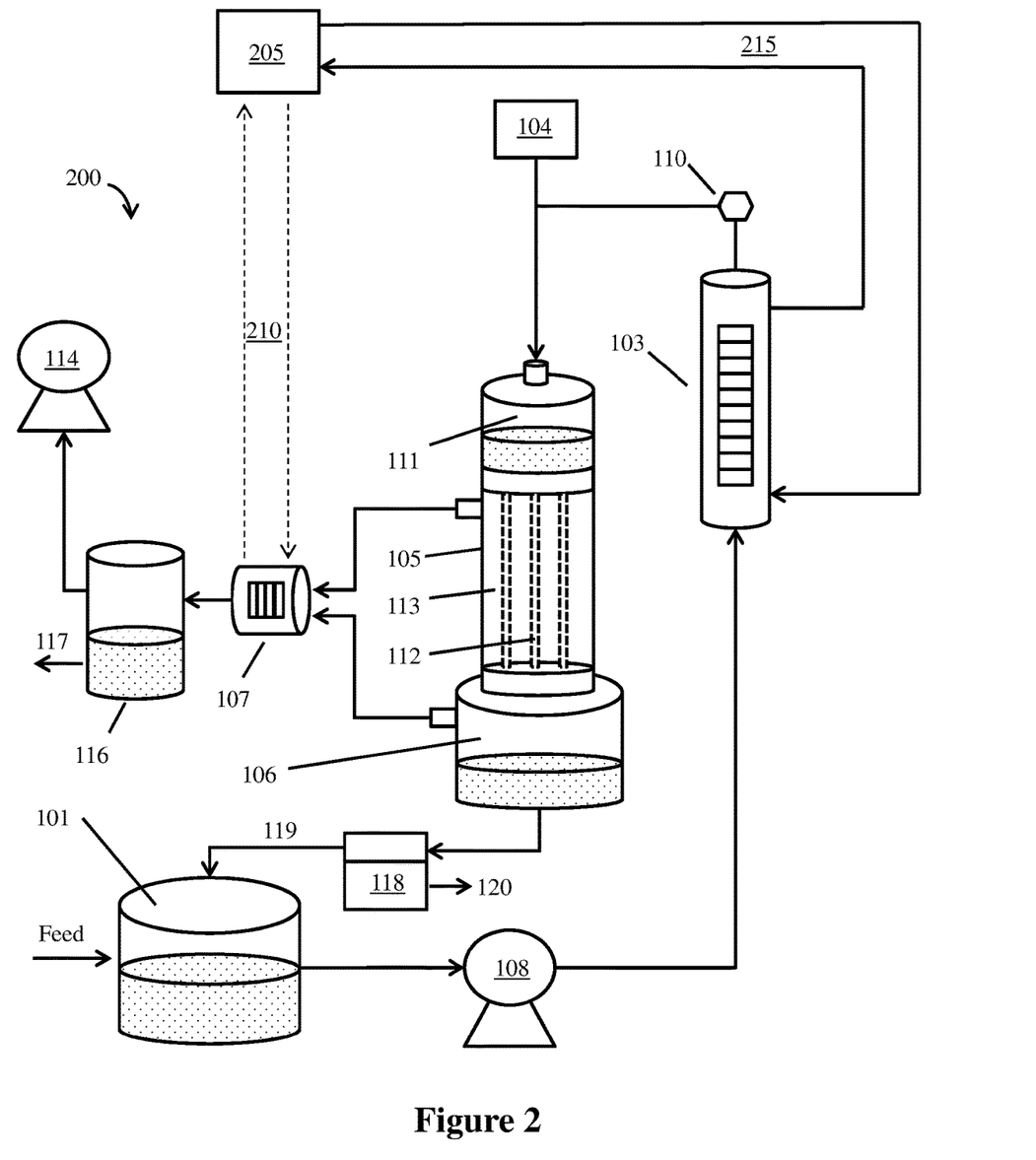
FIG. 2 is a schematic drawing of an embodiment of a water treatment system in accordance with embodiments of the invention whereby this embodiment utilizes a heat pump.

Another embodiment of the water treatment system 200 is illustrated in FIG. 2. In addition to the elements disclosed in FIG. 1, a heat pump (205) is additionally used in this embodiment. One skilled in the art will recognize that the heat pump (205) is a standard device that may be used to transfer any heat from the liquids in loop (210) into the liquids in loop (215) and that the exact workings of the heat pump (205) has been omitted for brevity. The liquids flowing in loop (210) may then be used to assist the condensation process occurring in condenser (107) while the liquids in loop (215) may be used to further heat heating element (103).

In some embodiments, the water treatment system may comprise heat pipes that are used to directly transfer the heat released during condensation at the condenser (107) to the heating element (103) or may be used to directly heat the wastewater before the wastewater is directed into membrane module (105). In other embodiments, part of the water vapour from the condenser (107), expansion chamber (106) or the collection space (113) may be channelled to the heating element (103) or to directly heat the wastewater in conduits within the water treatment system as the wastewater flows from feed tank (101) prior to entering membrane module (105).

Figure 3:
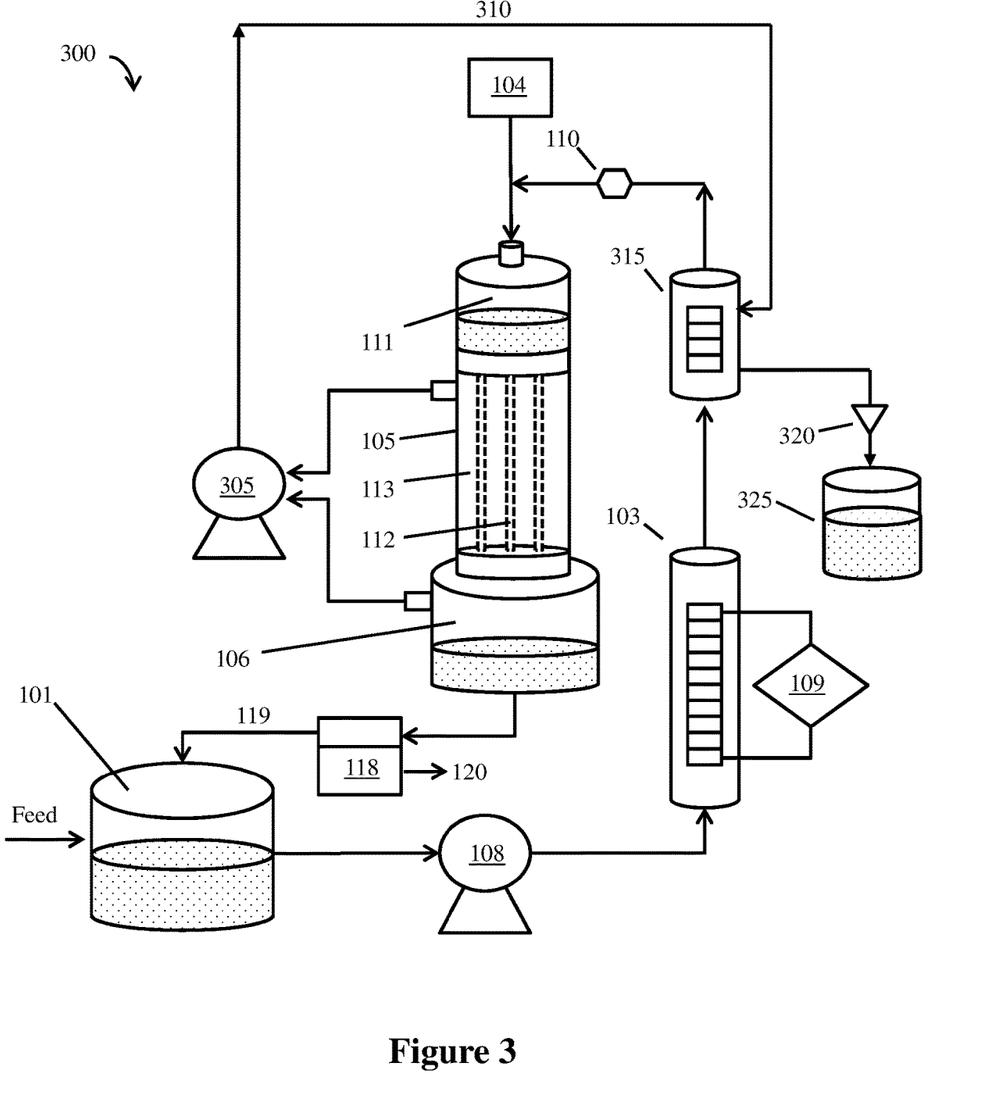
FIG. 3 is a schematic drawing of an embodiment of a water treatment system in accordance with embodiments of the invention whereby this embodiment utilizes an initial preheater for heating the feed solution and a compressor that is in fluid communication with a heat exchanger.

Yet another embodiment of the invention is illustrated in FIG. 3. In this embodiment, a compressor (305) and an additional heat exchanger (315) are utilized. When the wastewater is initially pumped from feed tank (101), heating element (103) will be used to initially heat the wastewater. The heated wastewater is then pressurized and directed into membrane module 105 as previously described. As illustrated in FIG. 3, compressor (305) is used to maintain the ambient pressure in collection chamber (113) and expansion chamber (106) at a partial vacuum. The compressor (305) is also used to extract the water vapour from the collection chamber (113) and expansion chamber (106). The extracted water vapour is then pressurized by the compressor (305) before it is directed to heat exchanger (315) via path (310). Heat and pressure from the pressurized water vapour is then used by the heat exchanger (315) to heat wastewater from feed tank (101). In this embodiment, the heat exchanger (315) also acts as a condenser. As the heat exchanger (315) removes heat from the water vapour, this causes the water vapour to condense and the clean water is then collected in container (325). A valve (320) provided between the heat exchanger (315) and the container (325) may be used to control the flow of condensed water from the heat exchanger (315). This in turn controls the temperature of the heat exchanger (315) whereby more water is released into the container (325) when the temperature in the heat exchanger (315) drops.

After the system 300 has been running for a certain period of time, the heat exchanger (315) would have acquired sufficient heat and pressure from the water vapour pumped by the compressor (305). When this happens, the heating element (103) will no longer be required to heat the wastewater from the feed tank (101) as the residual heat and pressure from the collected water vapour would be sufficient to heat and pressurize the wastewater in the heat exchanger (315). Hence, the heating element (103) may be bypassed and the wastewater may be directed from the feed tank (101) directly to heat exchanger (315). System 300 becomes highly energy efficient at this stage as all the generated heat or pressure is reused efficiently.

It should be noted that a series of tubes or pipes may be used to connect the various components shown in water treatment systems (100), (200) and (300) together. It is also useful to note that systems (100), (200) and (300) are scalable whereby multiple membrane modules (105) may be linked in parallel to a feed tank (100) and that heat generated by an initial membrane module may be used to heat the feed solution for a subsequent membrane module.

In another aspect of the invention, the feed tank (100) may be configured to receive and store liquid that is to be processed by the water treatment system. In this embodiment, the liquid may comprise heat-transfer liquids such as liquid desiccants, coolants or any type of liquid that is able to transfer heat easily and such liquids may also be collectively termed either as a feed solution or wastewater for this embodiment. As mentioned in the previous embodiments, when the feed solution passes through the heat exchangers, the feed solution will absorb heat from the heat exchanger. The heated feed solution is then pressurized and passed through the membrane module (105) and the expansion chamber (106). As heat is lost during this process, the resulting feed solution collected from the expansion chamber (106) is now at a much lower temperature than the temperature of the feed solution when it entered the membrane module (105). When systems (100), (200) or (300) are utilized as such, these systems may then be used as a cooler system for removing heat from a heat exchanger.

Figure 4:
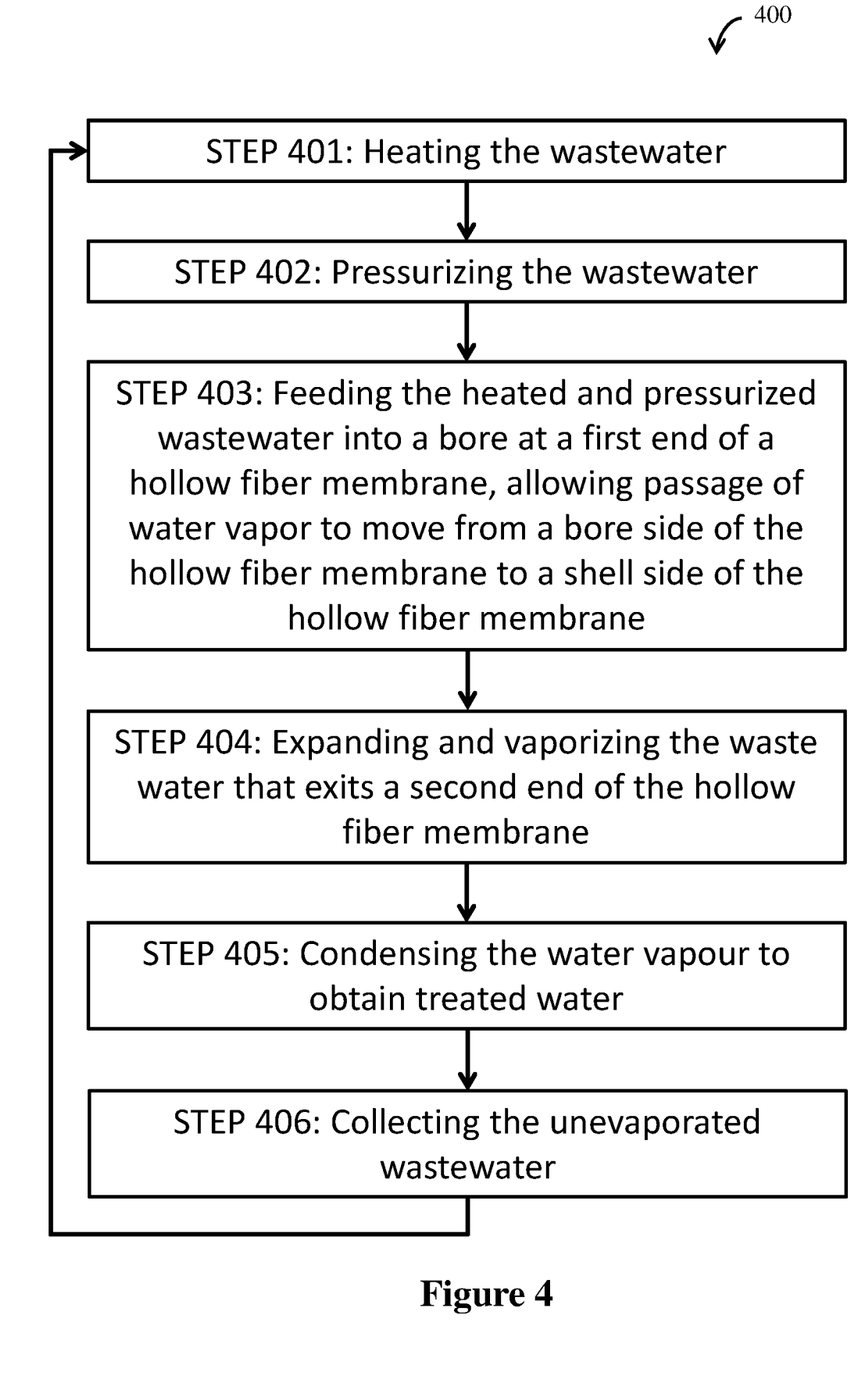
FIG. 4 illustrates a flowchart of an embodiment of a water treatment process in accordance with embodiments of the invention.

In yet another aspect of the present invention, a process of treating wastewater or feed solutions is provided. FIG. 4 shows a flowchart of process 400 that sets out the steps in accordance with an embodiment of the present invention. In Step 401, wastewater is heated and subsequently pressurized in Step 402. The person skilled in the art would readily understand that Step 401 and Step 402 may occur interchangeably or simultaneously without departing from this invention. The step of pressurising the wastewater reduces energy demands for heating the wastewater to a desired temperature.

In Step 403, the heated and pressurized wastewater is fed into a hollow bore of at least one hollow fiber membrane at a first end of the hollow fiber membrane. The hollow fiber membrane comprises a porous membrane permeable to water vapour but impermeable to liquid surrounding an inner hollow bore. As the heated and pressurized wastewater flows along the hollow fiber membrane, part of the wastewater evaporates and the resulting water vapour passes across the hollow fiber membrane from a bore side of the hollow fiber membrane to a shell side of the hollow fiber membrane owing to difference in vapour pressure between the bore side and the shell side.

Heated, pressurized wastewater flowing within the hollow bore of the hollow fiber membrane that has not evaporated exits a second end of the hollow fiber membrane and is subjected to a sudden decrease in pressure. This sudden decrease in pressure causes the exiting wastewater to expand and evaporate. In embodiments of the invention, water vapour is generated when the exiting wastewater rapidly expands.

In some embodiments, a vacuum or negative pressure may be applied to create a pressure difference across the hollow bore of the hollow fiber membrane and the second end of the hollow fiber membrane or across a wall of the hollow fiber membrane that drive the expansion of the wastewater exiting the hollow fiber membrane or improve water vapour transmission from the bore side of the hollow fiber membrane to the shell side of the hollow fiber membrane respectively.

In Step 405, the water vapour from the expanding wastewater and/or the water vapour that is transmitted from the bore side to the shell side of the hollow fiber membrane is condensed to obtain treated water.

In some embodiments, heat from the condensation of water vapour in Step 405 may be harnessed to heat the wastewater.

In a preferred embodiment, the unevaporated wastewater is collected at Step 406 and returned to Step 401 for subsequent treatment.

SETUP FOR THE EXAMPLES

In the following examples, a microporous and hydrophobic hollow fiber (HF) membrane module having an effective membrane area of 0.015 m$^2$ was utilized while a 3.5 wt % of sodium chloride solution was used as the feed solution or wastewater. In order to maintain the concentration of the sodium chloride solution at a constant level, fresh water was added to the feed tank to compensate for any water lost during the water treatment process.

In operation, the heated feed solution was pumped into the inlet of the membrane module at a constant flow rate of 60 Liter per Hour (LPH) while the pressure of the feed solution was maintained at 0.032 bar (3.2 kPa). A negative pressure of −0.2 bar (−20 kPa) was applied to the collection chamber in the membrane module and the expansion chamber to ensure that the ambient pressure in these two chambers are at a partial vacuum. For this example, it should be noted that the flux density was calculated using the standard weight loss method known to one skilled in the art whereby the flux density is defined as the volume flowing through the membrane per unit area per unit time.

Example 1

Effect of Varying Feed Solution's Temperature on the Flux of the System

Figure 5:
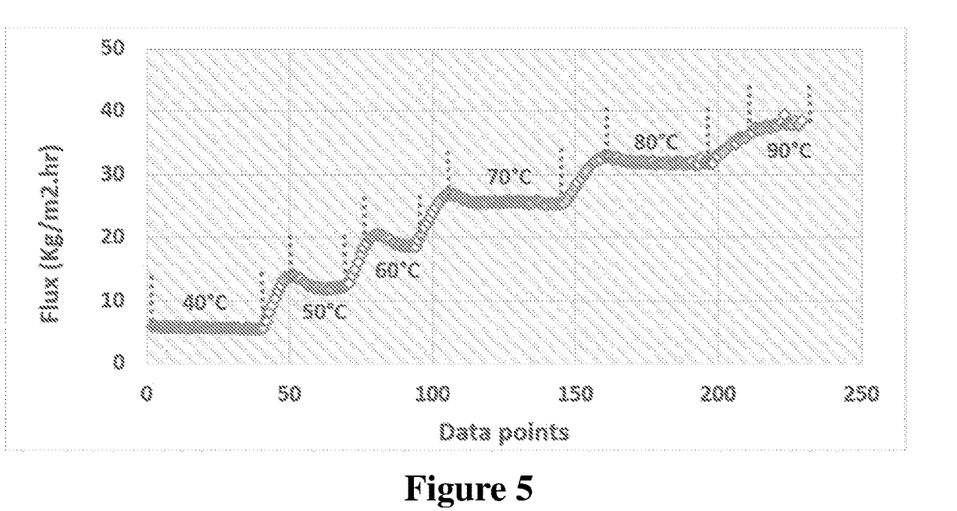
FIG. 5 illustrates the variation in the flux density of the water treatment system in accordance with embodiments of the invention as the temperature of the wastewater is increased.

In order to evaluate the effect of the feed solution's temperature on the performance of the water treatment system, the system's flux density was measured when the feed solution was heated to different temperatures, between 40° C. and 90° C. As illustrated in FIG. 5, it can be seen that the system's flux density increases as the feed solution's temperature increases and this is due to the high vapour pressure gradient that exists across the membrane. This high vapour pressure gradient across the membrane greatly contributes to the water treatment process. It can be seen that the highest flux density achieved was 39 L/m².hr when the feed solution was at a temperature of 90° C. The sodium chloride rejection was also measured at different feed solution temperatures and it was found that the salt rejection was more than 99% (>99%) for all temperatures.

Example 2

Effect of Running the System Over a Longer Period of Time

Figure 6:
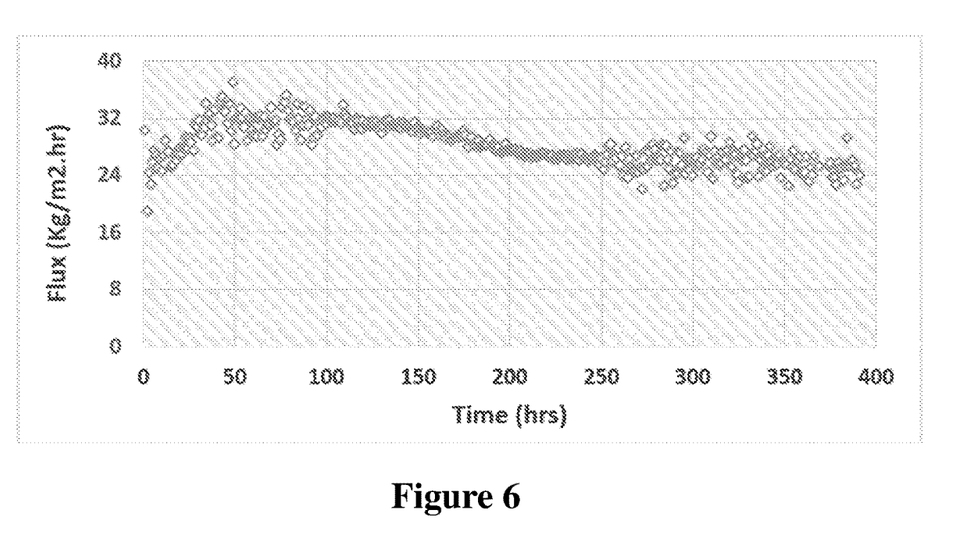
FIG. 6 illustrates the variation in the flux density of the water treatment system in accordance with embodiments of the invention as the system is operated over a period of time.

In this example the feed solution's temperature was maintained at 70° C. and the feed solution utilized a 3.5 wt % sodium chloride solution. Every hour, the system's flux density and the salt rejections efficiency were measured and the results are plotted in FIG. 6. From the experimental data, it can be seen that the system's flux density was stable throughout the experiment. More importantly, the salt rejection efficiency of the system was found to be at more than 99% (>99%) for the duration of this experiment.

Example 3

Effect of Feed Flow Rate on the Flux of the System

The effect of feed flow rate on the system's flux density was evaluated by adjusting the flow rate of the feed solution from 60 LPH to 210 LPH. For this example, the temperature of the feed solution was maintained constant at 70° C. and the vacuum in the expansion and collection chambers were kept constant at –0.2 bar (–20 kPa). The effect of varying the feed solution's flow rate on the system's flux density is illustrated in FIG. 7.

Figure 7:
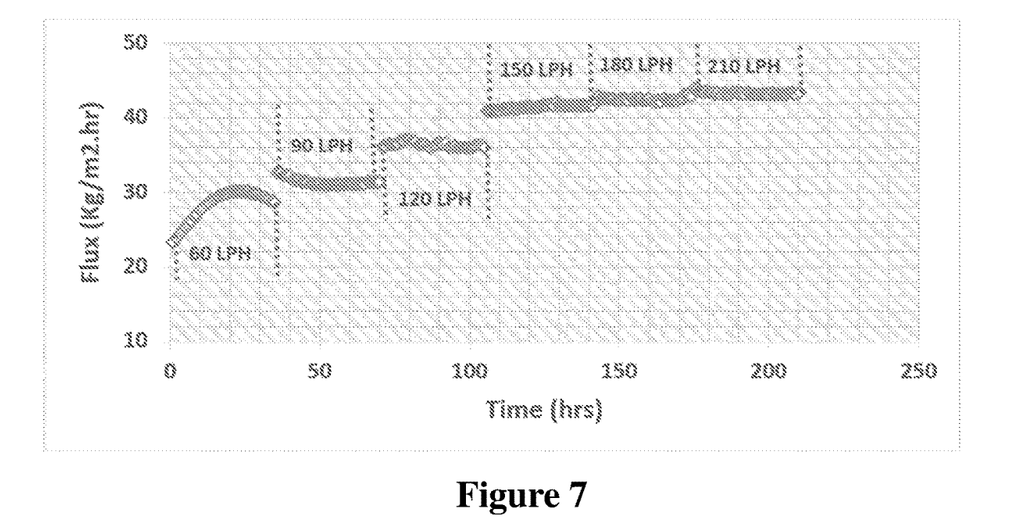
FIG. 7 illustrates the variation in the flux density of the water treatment system in accordance with embodiments of the invention as the flow rate of the wastewater is increased.

FIG. 7 shows that the system's flux density increased as the feed flow rate increased. This is due to the increasing vapour pressure gradient (ΔVP) across the membrane (inner hollow bore of the membrane and collection/expansion chamber). It is also found that the highest flux density achieved during this experiment is 44 LMH at a feed flow rate of 210 LPH, while the salt rejection was more than 99% (>99%).

Example 4

Effect of Pressure Difference on the Flux of the System

The effect of varying the pressure difference between the pressure in the inner hollow bore of the hollow fiber membrane and the pressure in the collection and expansion chambers on the flux of the system was evaluated by adjusting the feed pressure from 3.2 kPa to 70.1 kPa while the ambient pressure in the expansion and collections chambers were kept at a mild vacuum of –20 kPa. The results obtained are plotted in FIG. 8.

Figure 8:
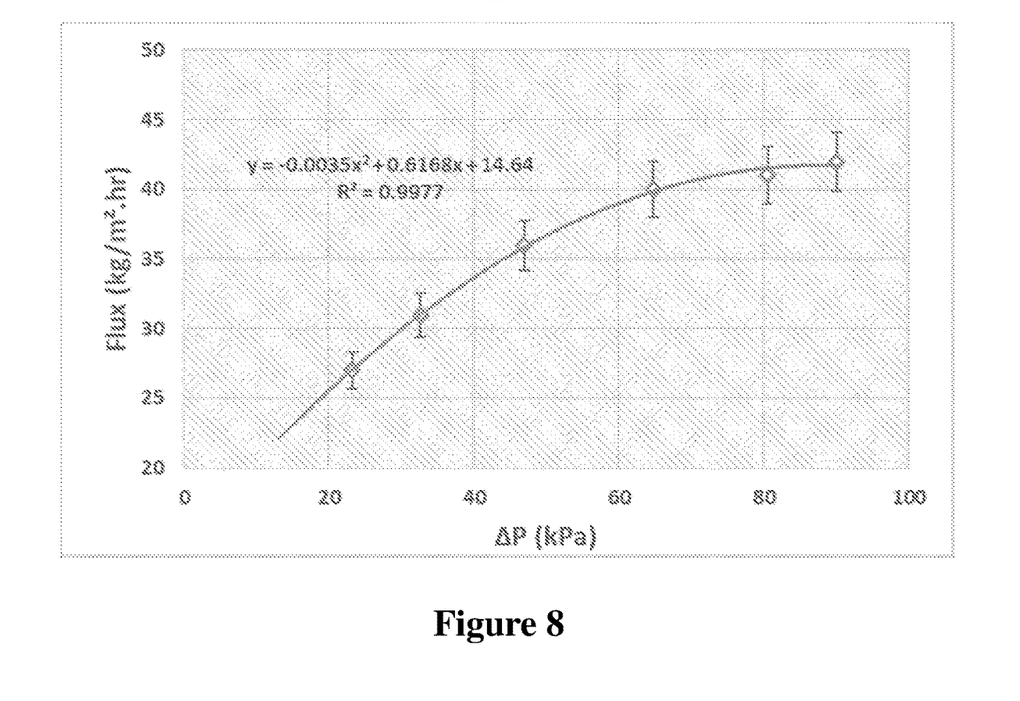
FIG. 8 illustrates the variation in the flux density of the water treatment system in accordance with embodiments of the invention as the pressure differential between the pressurized wastewater in the bore of the hollow fiber membrane and the pressure in the expansion chamber is increased.

It is noted that the system's flux density increased as the pressure difference between the hollow fiber's inner hollow bore and the expansion and collection chambers increased. This occurs due to the increase in the vapour pressure gradient (ΔVP) across the membrane (inner hollow bore of the membrane and expansion/collection chambers). It is also found that the highest flux density achieved in this example is 42 LMH when the pressure differential is at 90.1 kPa, while the salt rejection efficient was more than 99% (>99%).

Example 5

Effect of Air Bubble Injection into the Feed Solution

The effect of air bubbles in the heated, pressurized feed solution on the system's flux density was evaluated by injecting air bubbles using an air bubble generator into the feed solution before the feed solution was directed into the inner hollow bore of the hollow fiber membrane. The air flow rate of the air bubble generator was then adjusted from 0.0 LPH to 120 LPH while the feed solution's flow rate was maintained constant at 60 LPH.

Figure 9:
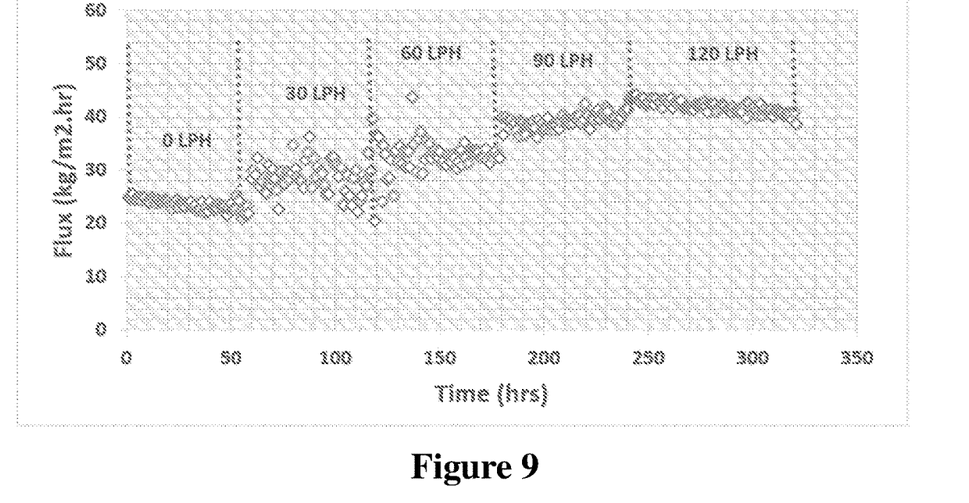
FIG. 9 illustrates the variation in the flux density of the water treatment system in accordance with embodiments of the invention as the flow rate of air bubbles that are introduced into the wastewater is increased.

FIG. 9 illustrates the effect of introducing air bubbles into the feed solution when the feed solution's temperature is constant at 70° C. while the vacuum in the expansion and collection chambers were kept constant at –0.2 bar (–20 kPa).

It can be seen that the system's flux density increased as the air flow rate of the air bubble generator increased. This is because the air bubbles cause the surface area of the feed solution to increase thereby increasing the vapour transfer process across the membrane. It is also found that the highest flux density achieved in this experiment is 43 LMH when the air flow rate of the air bubble generator is at 120 LPH, while the salt rejection efficiency was more than 99% (>99%).

Example 6

Effect of Running the System Over a Longer Period of Time and Under Certain Conditions For this example, the feed solution comprised a 3.5 wt % sodium chloride solution having a temperature of 70° C. and feed solution's flow rate was kept constant of 60 LPH. Additionally, an air bubble generator was set at a constant air flow of 120 LPH to introduce air bubbles into the feed solution.

Figure 10:
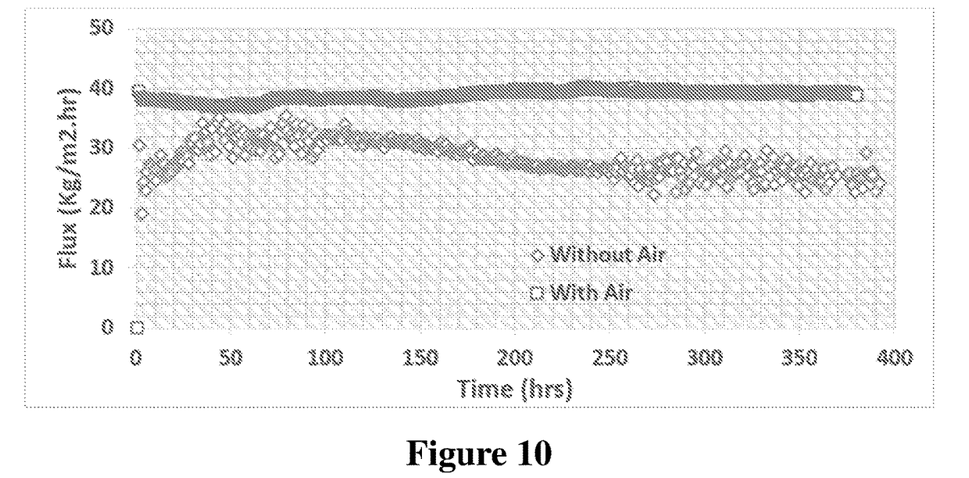
FIG. 10 illustrates the variation in the flux density of the water treatment system in accordance with embodiments of the invention over a period of time when the wastewater is maintained at 70° C., the flow rate of the waste water was set at 60 liter per hour (LPH) and the flow rate of air bubbles that are introduced into the wastewater is set at 120 LPH.

The system's flux density and the salt rejections were measured hourly and plotted in FIG. 10. From the experimental data, it can be seen that the system's flux density was stable throughout the experiment (of around 400 hrs) and more importantly the salt rejection ratio was found to be at more than 99% (>99%) throughout the experiment. As shown in FIG. 10, higher flux density was achieved when air bubbles were introduced into the feed solution.

Example 6

Figure 11:
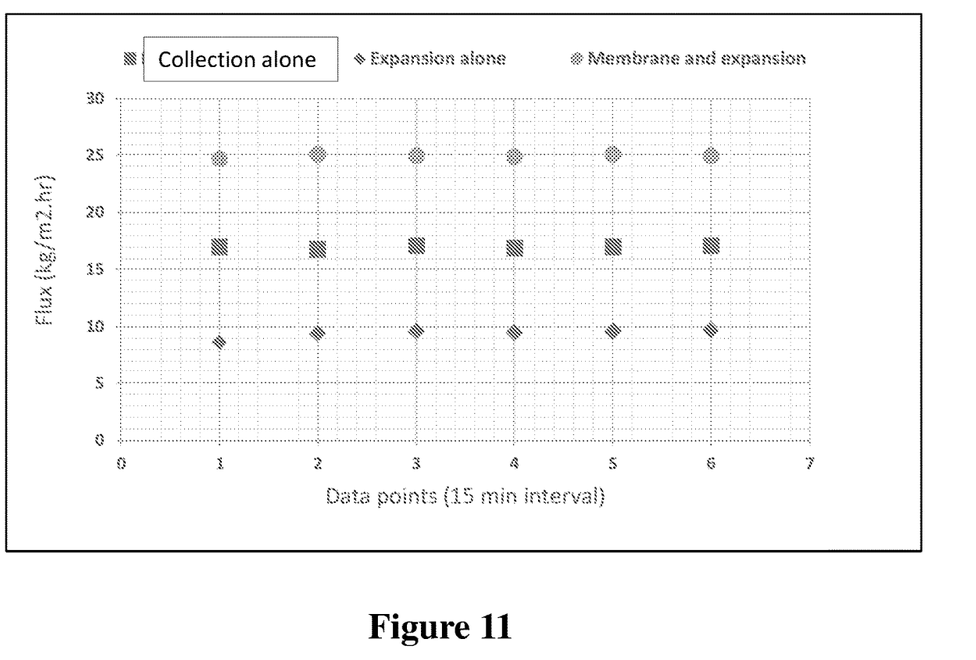
FIG. 11 illustrates the variation in the flux density of the water treatment system in accordance with embodiments of the invention (i.e. membrane and expansion), without the expansion chamber (i.e. collection alone) and without the membrane module (i.e. expansion alone) over time.

Effect of Collecting the Water Vapour from (i) Only the Collection Chamber; (ii) Only the Expansion Chamber; and (iii) the Collection and Expansion Chambers For this example, the system's flux density was measured when water vapour was collected only from the collection chamber (i.e. collection chamber alone), when the water vapour was collected only from the expansion chamber and when the water vapour was collected from both chambers. The results are plotted in FIG. 11. It can be seen that the highest output flux is achieved when the water vapour is collected from both the collection and expansion chambers.

The above is a description of a water treatment system having a membrane module that includes one or more hollow fiber membranes that extend between an inlet and an outlet of the membrane module and the one or more hollow fiber membrane has an inner bore for receiving and passing through pressurized and heated feed solution. The membrane module also includes a collection chamber maintained at a partial vacuum whereby the collection chamber is configured to collect water vapour from the inner bore of the hollow fiber membrane. The system additionally includes an expansion chamber having a partial vacuum. The expansion chamber is provided at the outlet of the membrane module and this expansion chamber causes the feed solution from the outlet of the membrane module to suddenly and rapidly expand as the feed solution exits the outlet of the membrane module. Water vapour from the expansion and collection chambers are then collected by a condenser.

It is foreseen that those skilled in the art can and will design alternative embodiments of this invention as set forth in the following claims.

The invention claimed is:

1. A system for treating a feed solution comprising:
a membrane module comprising:
at least one hollow fiber membrane extending between an inlet and an outlet of the membrane module, the hollow fiber membrane having an inner bore for receiving and passing through a pressurized and heated feed solution, and
a collection chamber configured to collect water vapour from the bore of the hollow fiber membrane, wherein a pressure difference exists between the collection chamber and the inner bore of the hollow fiber membrane;
an expansion chamber being provided at the outlet of the membrane module for causing the feed solution from the outlet of the membrane module to expand as the feed solution exits the outlet of the membrane module, wherein a pressure difference exists between the expansion chamber and the inner bore of the hollow fiber membrane; and
a condenser configured to receive and condense water vapour from the collection chamber and the expansion chamber.

2. The system according to claim 1 wherein the collection chamber and the expansion chamber are in fluid communication.

3. The system according to claim 1, further comprising:
a vacuum generator connected to the collection chamber or the expansion chamber, whereby the vacuum generator supplies a negative pressure to the collection chamber or the expansion chamber.

4. The system according to claim 1, wherein the membrane module further comprises:
a pressurization chamber provided adjacent the inlet of the membrane module for pressurizing the feed solution before the pressurized feed solution is directed to the inlet of the membrane module.

5. The system according to claim 1, further comprising:
an air bubble generator provided adjacent the inlet of the membrane module for bubbling the feed solution before the bubbled feed solution is directed to the inlet of the membrane module.

6. The system according to claim 1 further comprising:
a heater provided adjacent the inlet of the membrane module for heating the feed solution before the heated feed solution is directed to the inlet of the membrane module.

7. The system according to claim 1 whereby the condenser is configured to utilize heat absorbed from the water vapour to heat the feed solution before the heated feed solution is directed to the inlet of the membrane module.

8. The system according to claim 1 further comprising:
a non-return valve provided at the inlet of the membrane module for ensuring unidirectional flow of the feed solution to the inner bore of the hollow fiber membrane.

9. The system according to claim 1, wherein the hollow fiber membrane comprises a microporous structure, having an average pore size between 1 nanometre and 100,000 nanometres.

10. The system according to claim 9, wherein the average pore size is between 50 nanometres to 500 nanometres.

11. The system according to claim 1 further comprising:
a feed tank connected to the expansion chamber, the feed tank configured to collect the feed solution from the expansion chamber;
a tube having a first end connected to the feed tank and a second end connected to the inlet of the membrane module, the tube configured to direct the feed solution from the feed tank to the inlet of the membrane module, whereby a part of the tube is in contact with a heat exchanger such that heat from the heat exchanger is absorbed by the part of the tube.

12. A module for use in a system to treat a feed solution, the module comprising:
a membrane module comprising:
at least one hollow fiber membrane extending between an inlet and an outlet of the membrane module, the hollow fiber membrane having an inner bore for receiving and passing through a pressurized and heated feed solution, and
a collection chamber configured to collect water vapour from the bore of the hollow fiber membrane, wherein a pressure difference exists between the collection chamber and the inner bore of the hollow fiber membrane;
an expansion chamber being provided at the outlet of the membrane module for causing the feed solution from the outlet of the membrane module to expand as the feed solution exits the outlet of the membrane module, wherein a pressure difference exists between the expansion chamber and the inner bore of the hollow fiber membrane; and
wherein the collection chamber and the expansion chamber are configured to transmit water vapour to a condenser.

13. The module according to claim 12, wherein the collection chamber and the expansion chamber are in fluid communication.

14. The module according to claim 12 wherein the at least one hollow fiber membrane comprises a microporous structure, having an average pore size between 1 nanometre and 100,000 nanometres.

15. The method according to claim 14 wherein the average pore size is between 50 nanometres to 500 nanometres.

16. A method for treating a feed solution using a membrane module having at least one hollow fiber membrane extending between an inlet and an outlet of the membrane module and having a collection chamber, the method comprising:
receiving, at the inlet of the membrane module, a pressurized and heated feed solution;
passing the pressurized and heated feed solution through an inner bore of the at least one hollow fiber membrane;
collecting at the collection chamber, water vapour from the inner bore of the at least one hollow fiber membrane, whereby a pressure difference exists between the collection chamber and the inner bore of the at least one hollow fiber membrane;

expanding, at an expansion chamber provided at the outlet of the membrane module, feed solution from the outlet of the membrane module as the feed solution exits the outlet of the membrane module, whereby a pressure difference exists between the expansion chamber and the inner bore of the at least one hollow fiber; and receiving and condensing water vapour from the collection chamber and expansion chamber using a condenser.

17. The method according to claim 16, further comprising:

supplying a negative pressure to the collection chamber and the expansion chamber using a vacuum generator, whereby the collection chamber may or may not be in fluid connection to the expansion chamber.

18. The method according to claim 16, wherein before the step of receiving, at the inlet of the membrane module, the pressurized and heated feed solution, the method comprising the step of:

pressurizing the feed solution, using a pressurization chamber provided adjacent the inlet of the membrane module, before the pressurized feed solution is directed to the inlet of the membrane module.

19. The method according to claim 16, wherein before the step of receiving, at the inlet of the membrane module, the pressurized and heated feed solution, the method comprising the step of:

bubbling the feed solution, using an air bubble generator provided adjacent the inlet of the membrane module, before the bubbled feed solution is directed to the inlet of the membrane module.

20. The method according to claim 16, wherein before the step of receiving, at the inlet of the membrane module, the pressurized and heated feed solution, the method comprising the step of:

heating the feed solution, using a heater provided adjacent the inlet of the membrane module, before the heated feed solution is directed to the inlet of the membrane module.

21. The method according to claim 16 further comprising:

collecting the feed solution from the expansion tank using a feed tank connected to the expansion chamber;

directing the feed solution from the feed tank to the inlet of the membrane module using a tube having a first end connected to the feed tank and a second end connected to the inlet of the membrane module, whereby a part of the tube is in contact with the heat exchanger; and heating the feed solution in the tube as the feed solution passes the part of the tube that is in contact with the heat exchanger.

* * * * *